(12) United States Patent
Enomoto

(10) Patent No.: US 10,830,301 B2
(45) Date of Patent: Nov. 10, 2020

(54) SHORT CARBON FIBER-REINFORCED COMPOSITE MATERIAL AND METHOD FOR PRODUCING SAME

(71) Applicant: COORSTEK KK, Shinagawa-ku, Tokyo (JP)

(72) Inventor: Koji Enomoto, Kanagawa (JP)

(73) Assignee: COORSTEK KK, Tokyo (JP)

( * ) Notice: Subject to any disclaimer, the term of this patent is extended or adjusted under 35 U.S.C. 154(b) by 207 days.

(21) Appl. No.: 15/962,675

(22) Filed: Apr. 25, 2018

(65) Prior Publication Data

US 2018/0313419 A1 Nov. 1, 2018

(30) Foreign Application Priority Data

Apr. 28, 2017 (JP) ................. 2017-090225

(51) Int. Cl.
| | | |
|---|---|---|
| *F16D 69/02* | (2006.01) | |
| *C04B 35/573* | (2006.01) | |
| *C04B 35/80* | (2006.01) | |
| *C04B 37/00* | (2006.01) | |
| *F16D 65/12* | (2006.01) | |
| *B32B 18/00* | (2006.01) | |
| *C04B 35/83* | (2006.01) | |

(52) U.S. Cl.
CPC ............ *F16D 69/023* (2013.01); *B32B 18/00* (2013.01); *C04B 35/573* (2013.01); *C04B 35/806* (2013.01); *C04B 35/83* (2013.01); *C04B 37/008* (2013.01); *F16D 65/125* (2013.01); *C04B 2235/3826* (2013.01); *C04B 2235/526* (2013.01); *C04B 2235/5244* (2013.01); *C04B 2235/5248* (2013.01); *C04B 2235/5264* (2013.01); *C04B 2235/5445* (2013.01); *C04B 2235/656* (2013.01); *C04B 2235/96* (2013.01); *C04B 2237/365* (2013.01); *C04B 2237/38* (2013.01); *C04B 2237/385* (2013.01); *C04B 2237/582* (2013.01); *C04B 2237/584* (2013.01); *C04B 2237/61* (2013.01)

(58) Field of Classification Search
CPC .. F16D 65/12; F16D 69/023; F16D 2069/001; B32B 18/00; C04B 7/365; C04B 7/38; C04B 7/385; C04B 7/582; C04B 7/584; C04B 7/61; C04B 35/806; C04B 35/83; C04B 37/008; C04B 2235/428; C04B 2235/5248; C04B 2235/5268; C04B 2235/96; C04B 2237/365; C04B 2237/38; C04B 2237/385; C04B 2237/582; C04B 2237/584; C04B 2237/61; F16C 33/043; B01J 31/0274; B01J 21/08; B10J 21/08; Y10T 428/249928; Y10T 428/24993; Y10T 428/249945; Y10T 428/30; C10M 125/26
USPC ...... 428/292.1, 293.4, 299.1, 698, 794, 704; 264/29.1, 682, 29.2, 241, 29.5, 511, 258, 264/29.7; 501/88, 90, 99; 427/228, 427/383.7, 452, 283.7; 260/998.1; 156/329, 335, 89.26; 508/107
See application file for complete search history.

(56) References Cited

U.S. PATENT DOCUMENTS

| | | |
|---|---|---|
| 6,042,935 A | 3/2000 | Krenkel et al. |
| 2002/0068164 A1 | 6/2002 | Martin |
| 2003/0003286 A1 | 1/2003 | Gruber et al. |
| 2007/0284772 A1 | 12/2007 | Goller et al. |
| 2015/0291905 A1 * | 10/2015 | Takahashi et al. .. C10M 125/26 508/107 |

FOREIGN PATENT DOCUMENTS

| | | |
|---|---|---|
| EP | 2647863 A1 | 10/2013 |
| JP | H10-507733 A | 7/1998 |
| JP | 2002-255665 | 9/2002 |
| JP | 2004509792 T | 4/2004 |
| JP | 2006290670 A | 10/2006 |
| JP | 2008526662 T | 7/2008 |
| JP | 2013014445 A | 1/2013 |
| WO | 2014168112 A1 | 4/2014 |

OTHER PUBLICATIONS

Extended European Search Report for related EP App No. 18169199.9 dated Sep. 18, 2018, 8 pgs.
Office Action for related JP App. No. 2017090225 dated Jun. 23, 2020. English translation provided; 8 pages.

* cited by examiner

*Primary Examiner* — Camie S Thompson
(74) *Attorney, Agent, or Firm* — Procopio, Cory, Hargreaves & Savitch LLP

(57) ABSTRACT

The present invention relates to a short carbon fiber-reinforced composite material, including a base material part and at least one sliding part contacting the base material part, in which each of the base material part and the sliding part has a plurality of short carbon fiber bundles in which at least a part thereof has been converted into SiC and a SiC matrix present among the plurality of short carbon fiber bundles, as constituent components, and the short carbon fiber bundles of the sliding part have a SiC conversion higher than that of the short carbon fiber bundles of the base material part.

2 Claims, No Drawings

SHORT CARBON FIBER-REINFORCED COMPOSITE MATERIAL AND METHOD FOR PRODUCING SAME

TECHNICAL FIELD

The present invention relates to a composite material that is lightweight, has excellent abrasion resistance even under high temperature, and is suitable for use in a structural member such as a brake member.

BACKGROUND ART

Disc bake is one kind of brake system, and is mainly used in railway vehicles, automobiles, bicycles, and the like. The disc brake has a mechanism that a brake disc rotating together with wheels is sandwiched between brake pads from both side thereof to generate frictional force, and kinetic energy is converted into thermal energy to perform braking. Steel material such as stainless steel or chromium steel is generally used in a brake disc of railway vehicles, automobiles and the like.

However, in recent years, vehicle weight and unsprung weight are required to be reduced for enhancing running performance and improving fuel efficiency, and the brake disc is investigated to change to a material lighter than a steel material. Carbon fiber-reinforced silicon carbide ceramics are lightweight and have high strength, and are therefore given attention as one of such a material. The carbon fiber-reinforced silicon carbide ceramics are obtained by melt infiltrating C/C (carbon fiber-reinforced carbon) composite material with metallic silicon, performing a reaction of carbon of a matrix in the C/C composite material with silicon, and converting the carbon into silicon carbide. Silicon carbide has strong abrasion resistance and heat resistance, has remarkably excellent chemical stability, and is therefore suitable to give strength to a material.

In recent years, it is considered to use carbon fiber-reinforced silicon carbide ceramics for a brake disc. Brake disc having a core body and a friction layer is known in order to enhance damage tolerance of carbon fiber-reinforced silicon carbide ceramics.

For example, Patent Document 1 discloses a friction element that is a brake or a clutch, including a carbon fiber-reinforced porous carbon body having a friction surface, and a core body, the carbon body and the core body being connected to each other, in which at least a part of pores in the carbon body is filled with silicon and silicon carbide, and the carbon body is connected to the core body through a silicon carbide high temperature-resistant bonding layer containing silicon carbide at a side apart from the friction surface. The friction element of Patent Document 1 is obtained by placing the carbon body on the core body, infiltrating those with liquid silicon, and performing conversion into ceramics.

Patent Document 2 discloses a friction body including porous carbon infiltrated with silicon and reinforced with carbon fibers, the friction body having a friction layer and a core body. The friction body of Patent Document 2 is obtained by molding a friction layer, placing the friction layer in a molding die of the core body, and molding the friction layer together with the core body, followed by thermal decomposition and silicon infiltration.

PRIOR ART DOCUMENTS

Patent Document

Patent Document 1: JP-A-H10-507733

SUMMARY OF THE INVENTION

Problems that the Invention is to Solve

However, in the methods of Patent Documents 1 and 2, a boundary layer formed by silicon infiltration is formed at the boundary between a carbon body or a friction layer and a core body, and due to the boundary layer, there is a possibility that the problems of deterioration of strength and peeling occur.

Accordingly, the present invention has an object to provide a short carbon fiber-reinforced composite material including a base material part and a sliding part, having different physical properties, without formation of a boundary layer.

Means for Solving the Problems

A short carbon fiber-reinforced composite material of the present invention includes a base material part and at least one sliding part contacting the base material part, in which each of the base material part and the sliding part has a plurality of short carbon fiber bundles in which at least a part thereof has been converted into SiC, and a SiC matrix present among the plurality of short carbon fiber bundles, as constituent components, and the short carbon fiber bundles of the sliding part have a SiC conversion higher than that of the short carbon fiber bundles of the base material part.

The SIC conversion of the short carbon fiber bundles of the sliding part is 45% or more and 80% or less, and the SiC conversion of the short carbon fiber bundles of the base material part is 5% or more and 25% or less.

A method for producing a short carbon fiber-reinforced composite material of the present invention includes a step of mixing a phenol resin with short carbon fiber bundles for a base material part, wherein the short carbon fiber bundles are carbon-coated with a pitch, to obtain a mixture for a base material part, a step of mixing SIC and a phenol resin with short carbon fiber bundles for a sliding, part, wherein the short carbon fiber bundles are resin-coated with a phenol resin, to obtain a mixture for a sliding part, a step of placing the mixture for a sliding part and the mixture for a base material part in a molding die, followed by a pressure-molding under heating to obtain a cured body, a step of baking the cured body at 2000° C. or higher to obtain a baked body, and a step of infiltrating the baked body with silicon by a silicon melt infiltration process at about 1500° C. in vacuum.

In the present invention, a short carbon fiber-reinforced composite material having high strength and high toughness can be obtained without forming a boundary layer between the base material part and the sliding part by the above constitution.

Advantageous Effects of the Invention

According to the present invention, the short carbon fiber-reinforced composite material having a high strength and high toughness in a base material part and a sliding part, which has a sliding layer having high abrasion resistance can be provided without formation of a boundary layer between the base material part and the sliding part. In the case where such the short carbon fiber-reinforced composite material is used as, for example, a disc brake, abrasion resistance can be remarkably enhanced as compared with a conventional one.

Mode for Carrying Out the Invention

The short carbon fiber-reinforced composite material of the present invention is prepared by a silicon melt infiltration (MI) process, and the short carbon fiber-reinforced composite material includes a base material part and at least one sliding part contacting the base material part, in which each of the base material part and the sliding part has a plurality of short carbon fiber bundles in which at least a part thereof has been converted into SiC, and a SiC matrix present among the plurality of short carbon fiber bundles, as constituent components, and the short carbon fiber bundles of the sliding part have a SiC conversion higher than that of the short carbon fiber bundles of the base material part. Each element is described below.

The short carbon fiber-reinforced composite material includes a base material part and at least one sliding part integrated with the base material part. Specifically, the short carbon fiber-reinforced composite material may have a structure having one base material part and one sliding part, and may have a structure having a base material part sandwiched with two sliding parts.

The ratio (weight ratio) between the base material part and the sliding part in the short carbon fiber-reinforced composite material is approximately 3:1 to 5:1.

Each of the base material part and sliding part constituting the short carbon fiber-reinforced composite material contains a plurality of carbon fiber bundles in which at least a part thereof has been converted into SiC. The carbon fiber bundles in which at least a part thereof has been converted into SiC mean carbon fiber bundles in which a part or the whole of carbon fibers contained in fiber bundles has been converted into silicon carbide (hereinafter also simply referred to as "carbon fiber bundles"). Those carbon fiber bundles may be oriented in parallel form and may have a structure in which they are randomly oriented two-dimensionally or three-dimensionally in the base material part and sliding part. The term "parallel form" means that the carbon fiber bundles are oriented in parallel to its length direction. However, all of the short carbon fiber bundles may not always be accurately oriented in one direction, and a part thereof may be oriented deviating from parallel form.

As raw material of the carbon fiber bundles, commercially available carbon fibers can be used. Various carbon fibers having properties of high strength and high elastic modulus are known. High strength pitch-based carbon fibers are preferably used in a brake disc that is the preferred embodiment of the present invention.

Fiber diameter in the short carbon fibers is generally 10 μm or more and 15 μm or less. The maximum diameter of the carbon fiber bundles is 1.5 mm or more and 2.5 mm or less. Fiber length of the short carbon fiber bundles is generally 4 mm or more and 8 mm or less.

Each of the base material part and the sliding part has the short carbon fiber bundles and SiC matrix present among those short carbon fiber bundles.

The SiC matrix is a component fixing the short carbon fiber bundles, densifying the short carbon fiber-reinforced composite material, and giving strength as a material.

For example, a phenol resin is preferably used as SiC matrix in the base material part. After the phenol resin is mixed with the short carbon fiber bundles, the resulting mixture is generally baked at 2000° C. or higher to carbonize, and silicon (Si) is melt infiltrated to perform a reaction, thereby converting into SiC.

For example, pitch is preferably used as SiC matrix in the sliding part. After the pitch is mixed with the short carbon fiber bundles, the resulting mixture is generally baked at 2000° C. or higher to carbonize, and silicon (Si) is melt infiltrated to perform a reaction, thereby converting into SiC.

The SiC matrix is preferably present in an amount of approximately 50 wt % or more and 70 wt % or less, based on the short carbon fiber bundles.

The base material part and sliding part each may contain, other than short carbon fiber bundles and SiC matrix, additives such as carbon black and Si in a range that does not impair the effects of the present invention, for example, an amount of about 1 to 5 wt %.

The short carbon fiber bundles of the sliding part have SiC conversion higher than that of the short carbon fiber bundles of the base material part. Therefore, as compared with the base material part, the sliding part has high abrasion resistance and heat resistance and has highly excellent chemical stability. However, because the sliding part contains a large amount of SiC, toughness is poor and brittleness is large. On the other hand, because the base material part has low SiC content, flexibility is high as compared with the sliding part. Thus, the present invention can provide a short carbon fiber-reinforced composite material having suppressed generation of brittle fracture while securing abrasion resistance and strength by having both the base material part having high flexibility and the sliding part having high strength.

SiC conversion can be obtained by measuring element concentration of the short carbon fiber bundles exposed on the cross-section of the short carbon fiber-reinforced composite material by energy dispersive X-ray spectroscopy (EDX).

The SiC conversion of the short carbon fiber bundles of the sliding part is 45% or more and 80% or less, and the SiC conversion of the short carbon fiber bundles of the base material part is 5% or more and 25% or less.

In the case where the SiC conversion of the short carbon fiber bundles of the sliding pan exceeds 80%, the difference of thermal expansion between the sliding part and the base material part is large, and cracks may be generated. On the other hand, in the case where the SiC conversion of the short carbon fiber bundles of the sliding part is less than 45%, many fibers remain in the form of carbon, and abrasion tends to be increased. In the case where the SiC conversion of the short carbon fiber bundles of the base material part exceeds 25%, toughness tends to be deteriorated. On the other hand, in the case where the SiC conversion of the short carbon fiber bundles of the base material part is less than 5%, the difference of thermal expansion between the sliding part and the base material part is large, and cracks may be generated.

A method for producing a short carbon fiber-reinforced composite material of the present invention includes a step of mixing a phenol resin with short carbon fiber bundles for a base material part, wherein the short carbon fiber bundles are carbon-coated with pitch, to obtain a mixture for a base material part, a step of mixing. SiC and a phenol resin with short, carbon fiber bundles for a sliding part, wherein the short carbon fiber bundles are resin-coated with a phenol resin, to obtain a mixture for a sliding part, a step of placing the mixture for a sliding part and the mixture for a base material part in a molding die, followed by a pressure-molding under heating to obtain a cured body, a step of baking the cured body at 2000° C. or higher to obtain a baked body, and a step of infiltrating the baked body with silicon by a silicon melt infiltration process at about 1500° C. in vacuum.

The method for producing a short carbon fiber-reinforced composite material is described below by way of an example.

Phenol resin is mixed with short carbon fiber bundles for a base material part, wherein the short carbon fiber bundles are carbon-coated with pitch or the like, to prepare a mixture for a base material part. On the other hand, SiC and a phenol resin are mixed with short carbon fiber bundles for a sliding part, wherein the short carbon fiber bundles are resin-coated with a phenol resin or the like, to prepare a mixture for a sliding part. The mixture for a sliding part, the mixture for a base material part and the mixture for a sliding part are placed in a molding die in this order, followed by pressure-molding under heating, thereby obtaining a cured body. The cured body is then baked at 2000° C. or higher to obtain a baked body. The baked body is further infiltrated with silicon by a silicon melt infiltration (MI) process at about 1500° C. in vacuum. Thus, a short carbon fiber-reinforced composite material can be obtained.

The production of the short carbon fiber-reinforced composite material is not, limited to the above method, and the short carbon fiber-reinforced composite material can be produced by various conventional methods.

In the present invention, the mixture for a base material part and the mixture for a sliding part are placed in a molding die in a particle state, and a short carbon fiber-reinforced composite material having a base material part and a sliding part is integrally molded. As a result, a boundary layer is not formed between the base material part and the sliding part, and deterioration of strength and generation of peeling due to the boundary layer do not occur. Therefore, the short carbon fiber-reinforced composite material of the present invention has high strength and high toughness, and in the case where it is used as, for example, a disc brake, abrasion resistance can be remarkably enhanced as compared with a conventional one.

Bending strength according to JIS R1601:2008 of the short carbon fiber-reinforced composite material is generally 100 to 150 MPa, and preferably 120 to 150 MPa. In the case where the bending strength is within the above range, the short carbon fiber-reinforced composite material can have sufficient strength when used as a disc brake.

Fracture energy of the short carbon fiber-reinforced composite material is generally 800 to 2000 J/m$^2$, and preferably 1200 to 2000 J/m$^2$. In the case where the fracture energy is within the above range, the short carbon fiber-reinforced composite material can have sufficient toughness for using as a disc brake. In the present description, the fracture energy is energy that can be added to an object until fracture and is measured by The Ceramic Society of Japan JCRS-201 "Testing Method for Fracture Energy of Ceramic Composites by Quasi-static Fracture of 3-point Bend Specimen with Chevron-notch".

EXAMPLES

The present invention is further specifically described below based on Examples, but the present invention is not construed as being limited to the following Examples.

Example 1

Short carbon fiber bundles (diameter: 7 μm or more and 15 μm or less, length: 4 mm or more and 14 mm or less, 4,000 fibers per bundle) for a base material part were dipped in a solution obtained by diluting pitch with ethanol to 50 wt % such that the bundles were sufficiently dipped in the solution. The bundles were then taken out of the solution and dried at 100° C. or lower for 100 minutes or more. Thus, carbon-coated short carbon bundles for a base material part were obtained.

Short carbon fiber bundles (diameter: 7 μm or more and 15 μm or less, length: 4 mm or more and 14 mm or less, 4,000 fibers per bundle) for a sliding part were dipped in a solution obtained by diluting a phenol resin with ethanol to 50 wt % such that the bundles were sufficiently dipped in the solution. The bundles were then taken out of the solution and dried at 100° C. or lower for 100 minutes or more. Thus, resin-coated short carbon bundles for a sliding part were obtained.

Next, 70 to 80 wt % of the short carbon fiber bundles for a base material part were mixed with 20 to 30 wt % of phenol resin (the total of short carbon fiber bundles for base material part and phenol resin is 100 wt %) and ethanol to obtain a mixture for a base material part.

Similarly, 65 to 75 wt % of the short carbon fiber bundles for a sliding part were mixed with 10 to 30 wt % of SiC (average particle diameter: 0.5 μm), 5 to 15 wt % of phenol resin (the total of short carbon fiber bundles for sliding part, SiC and phenol resin is 100 wt %), and ethanol to obtain a mixture for a sliding part.

The mixture for a sliding part, the mixture for a base material part and the mixture for a sliding part were placed in a molding die in this order, molded at 100° C. or higher under a pressure of 100 kgf/cm$^2$ or more, and then heated at 800° C. or higher for 100 minutes or more. Thus, a cured body having 150 mm diameter and 15 mm thickness was obtained.

The cured body is baked at 2000° C. or higher for 40 minutes or more in a reducing atmosphere to obtain a baked body. The baked body obtained was further infiltrated with molten silicon at about 1500° C. in vacuum to obtain a short carbon fiber-reinforced composite material.

The SiC conversion, bending strength and fracture energy of the short carbon fiber-reinforced composite material obtained were measured by the following methods.

[SiC Conversion]

Short carbon fiber-reinforced composite material was cut and polished to expose the cross-section of short carbon fiber bundles. Adjustment was performed such that X-ray points the center of the short carbon fiber bundles, and EDX analysis was performed. SiC proportion of the short carbon fiber bundles was calculated from peak intensity ratio of Si and C obtained. Cross-sections at optional different 10 places of the short carbon fiber bundles were subjected to EDX analysis, and the average value of the SiC proportions calculated was defined as SiC conversion.

[Bending Strength]

Test piece of 3 mm×4 mm×40 mm was prepared, and 3-point bending strength (MPa) was measured under crosshead speed of 0.5 mm/min by the method according to JIS R1601:2008.

[Fracture Energy]

Test piece of 3 mm×4 mm×40 mm was prepared, a straight notch having a depth of about 2 mm was formed at a central part thereof by using a diamond blade having a thickness of 0.1 mm, and fracture energy was measured according to JCRS-201. Distance between supporting points was 30 mm, crosshead speed was 0.01 mm/min, and fracture energy (J/cm$^2$) per unit area until 5% of maximum load value was obtained.

Example 2

A short carbon fiber-reinforced composite material was obtained in the same manner as in Example 1, except that the short carbon fiber bundles for a base material part were dipped in a solution obtained by diluting pitch with ethanol to 60 wt % and the short carbon fiber bundles for a sliding part were dipped in a solution obtained by diluting a phenol resin with ethanol to 60 wt %.

The SiC conversion, bending strength and fracture energy of the short carbon fiber-reinforced composite material were measured in the same manners as in Example 1.

Example 3

A short carbon fiber-reinforced composite material was obtained in the same manner as in Example 1, except that the short carbon fiber bundles for a base material part were dipped in a solution obtained by diluting pitch with ethanol to 35 wt % and the short carbon fiber bundles for a sliding part were dipped in a solution obtained by diluting a phenol resin with ethanol to 35 wt %.

The SiC conversion, bending strength and fracture energy of the short carbon fiber-reinforced composite material were measured in the same manners as in Example 1.

Comparative Example 1

The same short carbon fiber bundles (diameter: 7 μm or more and 15 μm or less, length: 4 mm or more and 14 mm or less, 4,000 fibers per bundle) were used in the base material part and the sliding part, and dipped in a solution obtained by diluting a phenol resin with ethanol to 50 wt % such that the carbon fiber bundles were sufficiently dipped in the solution. The bundles were then taken out of the solution and dried at 100° C. or lower for 100 minutes or more to obtain resin-coated short carbon fiber bundles. Then, 70 to 80 wt % of the short carbon fiber bundles were mixed with 20 to 30 wt % of phenol resin (the total of short carbon fiber bundles and phenol resin is 100 wt %) to obtain a mixture for a base material part. A short carbon fiber-reinforced composite material was then obtained in the same manner as in Example 1.

The SiC conversion, bending strength and fracture energy of the short carbon fiber-reinforced composite material were measured in the same manners as in Example 1.

The results of Examples 1 to 3 and Comparative Example 1 are shown below.

TABLE 1

|  | SiC conversion of carbon fibers of sliding part (%) | SiC conversion of carbon fibers of base material part (%) | Bending strength (MPa) | Fracture energy (J/m$^2$) |
|---|---|---|---|---|
| Example 1 | 55 | 12 | 175 | 2020 |
| Example 2 | 46 | 7 | 134 | 1960 |
| Example 3 | 78 | 25 | 191 | 1460 |
| Comparative Example 1 | 55 | 56 | 45 | 825 |

While the present invention has been explained in detail with reference to specific embodiments, it is apparent to one skilled in the art that various changes and modifications can be made therein without departing from the spirit and scope of the present invention.

This application is based on Japanese Patent Application (No. 2017-090225) filed on Apr. 28, 2017, the contents of which are incorporated herein by reference.

The invention claimed is:

1. A short carbon fiber-reinforced composite material, comprising a base material part and at least one sliding part contacting the base material part, wherein:
   each of the base material part and the sliding part has a plurality of short carbon fiber bundles in which at least a part thereof has been converted into SiC, and a SiC matrix present among the plurality of short carbon fiber bundles, as constituent components; and
   the short carbon fiber bundles of the sliding part have a SiC conversion higher than that of the short carbon fiber bundles of the base material part,
   wherein the SiC conversion of the short carbon fiber bundles of the sliding part is 45% or more and 80% or less, and the SiC conversion of the short carbon fiber bundles of the base material part is 5% or more and 25% or less.

2. A method for producing a short carbon fiber-reinforced composite material according to claim 1, comprising:
   a step of mixing a phenol resin with short carbon fiber bundles for a base material part, wherein the short carbon fiber bundles are carbon-coated with a pitch, to obtain a mixture for a base material part;
   a step of mixing SiC and a phenol resin with short carbon fiber bundles for a sliding part, wherein the short carbon fiber bundles are resin-coated with a phenol resin, to obtain a mixture for a sliding part;
   a step of placing the mixture for a sliding, part and the mixture for a base material part in a molding die, followed by a pressure-molding under heating to obtain a cured body;
   a step of baking the cured body at 2000° C. or higher to obtain a baked body; and
   a step of infiltrating the baked body with silicon by a silicon melt infiltration process at about 1500° C. in vacuum.

* * * * *